United States Patent
Day et al.

(10) Patent No.: US 9,215,064 B2
(45) Date of Patent: Dec. 15, 2015

(54) DISTRIBUTING KEYS FOR DECRYPTING CLIENT DATA

(71) Applicant: Adobe Systems Incorporated, San Jose, CA (US)

(72) Inventors: Jeffrey Michael Day, Springville, UT (US); Peter Raymond Fransen, Lehi, UT (US)

(73) Assignee: Adobe Systems Incorporated, San Jose, CA (US)

( * ) Notice: Subject to any disclaimer, the term of this patent is extended or adjusted under 35 U.S.C. 154(b) by 165 days.

(21) Appl. No.: 14/058,460

(22) Filed: Oct. 21, 2013

(65) Prior Publication Data

US 2015/0113276 A1 Apr. 23, 2015

(51) Int. Cl.
*H04L 29/06* (2006.01)
*H04L 9/08* (2006.01)

(52) U.S. Cl.
CPC ............ *H04L 9/0819* (2013.01); *H04L 9/0861* (2013.01)

(58) Field of Classification Search
CPC combination set(s) only.
See application file for complete search history.

(56) References Cited

U.S. PATENT DOCUMENTS

| | | | |
|---|---|---|---|
| 8,719,572 B2* | 5/2014 | Schertzinger | 713/170 |
| 2002/0106085 A1* | 8/2002 | Jain et al. | 380/277 |
| 2004/0098609 A1* | 5/2004 | Bracewell et al. | 713/200 |
| 2012/0084570 A1* | 4/2012 | Kuzin et al. | 713/182 |
| 2013/0086651 A1* | 4/2013 | Kavantzas et al. | 726/5 |
| 2014/0310526 A1* | 10/2014 | Pahl et al. | 713/171 |

* cited by examiner

*Primary Examiner* — Jeffrey Pwu
*Assistant Examiner* — William Corum, Jr.
(74) *Attorney, Agent, or Firm* — Kilpatrick Townsend & Stockton LLP

(57) ABSTRACT

In some embodiments, a server can establish a session with a remote client. The server can generate a session key portion for the session and a client key portion for the remote client. The server can use a combined encryption key to encrypt client data received from the remote client during the session. The combined encryption key can be generated from a static key portion accessible by the server, the session key portion, and the client key portion. The server can associate the session key portion with the session. The session key portion is accessible by the server during the session. The server can delete the client key portion after providing the client key portion to the remote client. The server can obtain the client key portion from the remote client in response to determining that subsequent transactions during the session involve decrypting the encrypted client data.

19 Claims, 8 Drawing Sheets

DISTRIBUTING KEYS FOR DECRYPTING CLIENT DATA

TECHNICAL FIELD

This disclosure relates generally to computer-implemented methods and systems and more particularly relates to distributing a key for decrypting client data.

BACKGROUND

Communication with server-based applications may involve transmitting client data from a remote client to a server. For example, front-end applications accessible via a data network (e.g., social media marketing application) may utilize multiple back-end services (e.g., analytics services, campaign development services, dashboard services, etc.). A front-end application that uses a given authentication credential for authenticating a user may access one or more back-end services that use different authentication credentials. Each transaction with a given back-end service may involve the front-end application transmitting an authentication credential specific to the back-end service on behalf of a user that is logged into the front-end application. During a session with a user, the front-end application may temporarily store the credential for the back-end service to avoid repeatedly prompting the user for the credential.

It is desirable to securely store credentials and other client data provided by a user to a server during a session with an application executed at the server.

SUMMARY

One embodiment involves establishing a session between a server and a remote client. The embodiment also involves generating a session key portion for the session and a client key portion for the remote client. The embodiment also involves encrypting client data received from the remote client during the session using a combined encryption key. The combined encryption key is generated from a static key portion accessible by the server, the session key portion, and the client key portion. The embodiment also involves associating the session key portion with the session. The session key portion is accessible by the server during the session. The embodiment also involves providing the client key portion to the remote client and deleting the client key portion from the server. The server obtains the client key portion from the remote client in response to determining that subsequent transactions during the session involve decrypting the encrypted client data.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
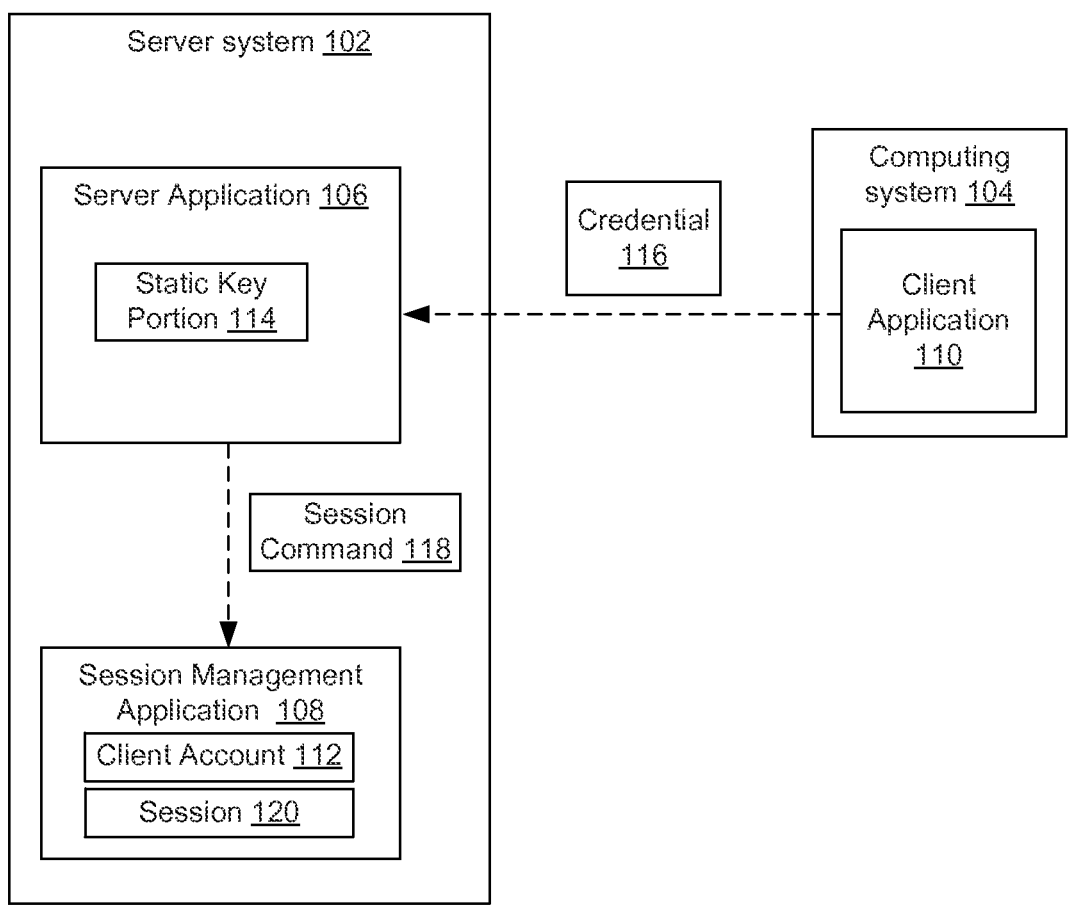
FIG. 1 is a modeling diagram depicting a server system and a computing system that can utilize a distributed encryption process.

Computer-implemented systems and methods are disclosed for distributing a key for decrypting client data. Distributing a key for decrypting client data can involve encrypting data with an encryption key, storing a first portion of the key at a server system, and providing a second portion of the key to a client system from which the client data is received. The server system can request the second portion in response to determining that the encrypted client data is to be used in a subsequent transaction.

The following non-limiting example is provided to help introduce the general subject matter of certain embodiments. An online application executed on a server and accessed over the Internet may store data received from a client during a session. For example, an online marketing application may store a plaintext password or user credentials for a user. The online marketing application may use the stored password or user credentials to access another online service on behalf of the user. For example, the online marketing application may use a back-end service, such as an analytics service, that requires different authentication credentials than the online marketing application. The online application can secure the stored client data during the session by encrypting the client data with an encryption key. The online application can provide a client portion of the encryption key to the remote client and delete the client portion of the encryption key from the server. For each transaction involving the client data, the online application can obtain the client portion of the encryption key from the client, decrypt and use the client data, and delete the client portion from the server after using the decrypted client data. Encryption and decryption using a distributed encryption key can improve data security by preventing an unauthorized party from accessing the encrypted data without having access to both the server portion of the key and the client portion of the key.

In accordance with some embodiments, a server system can distribute portions of a key used to decrypt client data. The server system can establish a session with a remote client. The server system can generate a session key portion for the session and a client key portion for the remote client. In a non-limiting example, the session key portion and the client key portion can be generated from a random number generator. The server system can use a combined encryption key to encrypt client data received from the remote client during the session. The combined encryption key can be generated from the static key portion, the session key portion, and the client key portion. The server system can associate the session key portion with the session such that the session key portion is accessible by the server system during the session. The server system can provide the client key portion to the remote client. In some embodiments, the server system can delete (or otherwise invalidate) the client key portion stored to the server system after providing the client key portion to the remote client.

As used herein, the term "static key portion" is used to refer to an alphanumeric text string that is used for generating a session key portion and a client key portion of an encryption key. The static key portion can be used in combination with the generated session key portion and the generated client key portion to generate a combined decryption key for decrypting client data. In some embodiments, the same static key portion can be used to generate session key portions and client key portions for different remote clients in different sessions.

As used herein, the term "session key portion" is used to refer to an alphanumeric text string that is stored to the server system and that can be used in combination with the client key portion and the static key portion to generate a combined decryption key during a session. A session key portion can be stored to the server system or otherwise be accessible by the server system. The session key portion can be specific to the session and can be used during the session with the remote client. The session key portion can be invalidated in response to expiration or other termination of the session with the remote client. For example, the same session key portion can be used to generate different combined encryption keys for encrypting different client data during a session.

As used herein, the term "client key portion" is used to refer to an alphanumeric text string that is stored to a remote client and that can be used in combination with the session key portion and the static key portion to generate a combined decryption key. In some embodiments, the client key portion can be specific to the session. For example, the client key portion can be generated based on a remote client being authenticated for a given session. The same client key portion can be used to generate different combined encryption keys for encrypting different client data during a session. The client key portion can expire or otherwise be invalidated based on expiration of the session (e.g., a cookie time-out at a browser application). In additional or alternative embodiments, the client key portion can be specific to a given set of client data. For example, different client key portions can be generated for different combined encryption keys used for encrypting different client data during a session.

As used herein, the term "session" is used to refer to a period of time during which an entity is authorized to access one or more applications hosted by or accessible via a server system. A session can be delineated by a first point in time at which an entity is authenticated and a second point in time at which the authentication is terminated. The authentication can be terminated by the entity logging out of a server application, the authentication expiring after a period of inactivity or other predetermined time period, etc.

As used herein, the term "entity" is used to refer to an individual, organization, or other logical identity that can be uniquely identified by an application executed on a server system. An entity can be identified by reference to one or more client accounts and/or by reference to a software identifier and/or hardware identifier associated with an application and/or device used to access the server system.

As used herein, the term "remote client" is used to refer to any entity that communicates with the server system via a data network. For example, a remote client can include a client application such as (but not limited to) a web browser application used to access the server system via a web site.

After providing the client key portion to the remote client, the server system can obtain the client key portion to decrypt the stored client data during subsequent transactions. The server system can determine that a transaction during the session involves the encrypted client data. For example, an online application may determine that a back-end service requires a stored, encrypted password received from the remote client. The server system can obtain the client key portion from the remote client in response to determining that the transaction involves the encrypted client data. For example, the server system can request the client key portion from the remote client. The remote client can transmit the client key portion via the data network. The server system can generate a combined decryption key from a combination of the static key portion, the session key portion associated with the session, and the client key portion received from the remote client. The server system can use the decryption key to decrypt the client data for the transaction.

Using a distributed encryption key can improve the security of client data stored during a session with a server. For example, an unauthorized entity that accesses the server system may be unable to decrypt client data without the client key portion stored at the remote client.

Using a distributed encryption key can also allow the server system to respond to different types of security breaches. A security breach can include any unauthorized access of a system involved in processing, storing, communicating, or otherwise using the client data. In some embodiments, the server system can determine that a security breach has occurred with respect to the remote client. For example, the server system can determine that session data for the session has been compromised or that the remote client has been compromised. The server system can invalidate the session in response to determining that the security breach has occurred. Invalidating the session can involve deleting one or more of the session key portion, the client key portion, and the encrypted client data.

In other embodiments, the server system can determine that a security breach has occurred with respect to the server system itself. The static key portion stored at the server system can allow for maintaining the security of encrypted data stored at the server system in the event that the server system is compromised. For example, the server system can determine that an unauthorized entity has obtained access to one or more servers in the server system. The server system can invalidate the static key portion in response to determining that the security breach has occurred. In some embodiments, invalidating the static key portion can prevent the generation of decryption keys for any active sessions with remote clients. In a non-limiting example, invalidating a static key portion can include deleting or changing the static key portion Referring now to the drawings, FIG. 1 is a modeling diagram depicting a server system 102 and a computing system 104 that can utilize a distributed encryption process.

The server system 102 can execute a server application 106 and a session management application 108. The server application 106 can include any server-based application that can be accessed via a data network by a client application 110 executed on a computing system 104. The session management application 108 can manage sessions established with remote clients, such as a computing system 104 executing a client application 110.

The client application 110 can establish a session by providing one or more credentials 116 to the server application 106. In a non-limiting example, the client application 110 may be a web browser application that can establish a session with a web site via which the server application 106 may be accessed. The credential 116 may include a user name, password, or other suitable credential used to verify that entity using the client application 110 is authorized to access the server application 106. The server application 106 can provide the credential 116 to the session management application 108 along with a session command 118. The session management application 108 can respond to the session command 118 by authenticating an entity using the client application 110. Authenticating the entity can involve comparing authentication information in the credential 116 with authentication information stored in the client account 112. The session management application 108 can establish an authenticated session 120 with the client application 110 based on the authentication information from the credential 116 matching the authentication information stored in the client account 112.

A static key portion 114 can be stored at the server system 102. The server application 106 can also use a random number generator or other suitable process to generate temporary key portions, as described in detail below. The static key portion 114 can be combined with one or more temporary key portions to generate an encryption key used to encrypt client data transmitted from the client application 110 to the server application 106.

Figure 2:
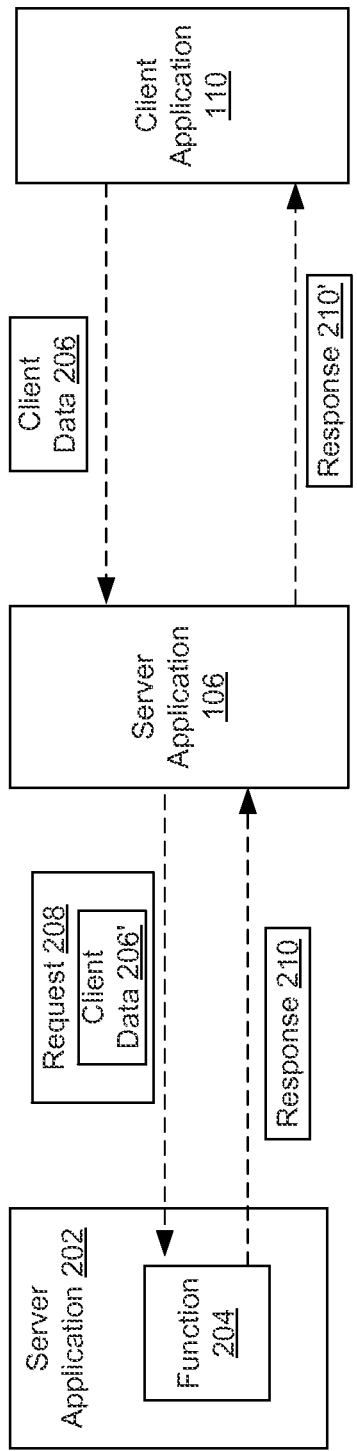
FIG. 2 is a modeling diagram depicting the server application obtaining client data from the client application for a transaction involving an additional server application.

For example, FIG. 2 is a modeling diagram depicting the server application 106 obtaining client data 206 from the client application 110 for a transaction involving an additional server application 202. The additional server application 202 can provide a function 204 used by the server application 106 during a session 120 with the client application 110. In some embodiments, the additional server application 202 can be executed at the server system 102. In other embodiments, the additional server application 202 can be executed at a server system different from and external to the server system 102. Accessing the function 204 on behalf of a client during a session may require the client data 206 from the client application 110. The server application 106 can obtain the client data 206 from the client application 110 and provide a request 208 for the function that includes copied client data 206'. The server application 202 can execute the function 204 using the client data 206' and provide a response 210. The server application 106 can forward the response 210' to the client application 110.

The security of the client data 206 can be improved by limiting transmission of the client data 206 over a data network. For example, the server application 106 may repeatedly request access to a function 204 provided by an additional server application 202 during a session 120. Each request for the function 204 may involve providing the client data 206 to the additional server application 202. The server application 106 can avoid repeated transmissions of the client data 206 from the computing system 104 to the server system 102 by maintaining an encrypted copy of the client data 206 at the server system 102.

Figure 3:
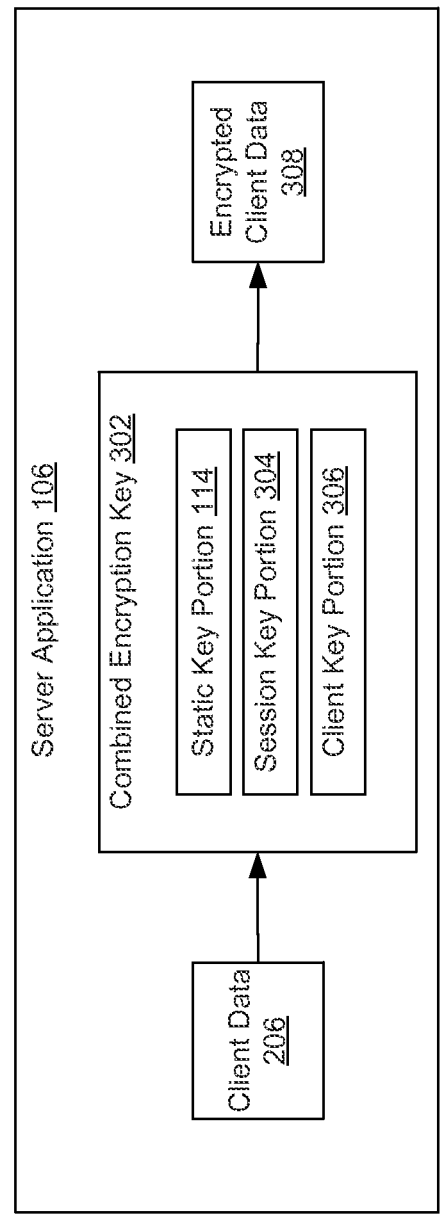
FIG. 3 is a modeling diagram depicting the server application encrypting the obtained client data to generate encrypted client data using a combined encryption key.

The server application 106 can use a distributed encryption process for maintaining a stored copy of the client data 206. For example, FIG. 3 is a modeling diagram depicting the server application 106 encrypting the obtained client data 206 to generate encrypted client data 308 using a combined encryption key 302. The server application 106 can generate a session key portion 304 and a client key portion 306 using a random number generator or other suitable process. The server application 106 can combine the static key portion 114, the session key portion 304, and the client key portion 306 to form the combined encryption key 302. The server application 106 can generate the encrypted client data 308 by encrypting the client data 206 with the combined encryption key 302.

Figure 4:
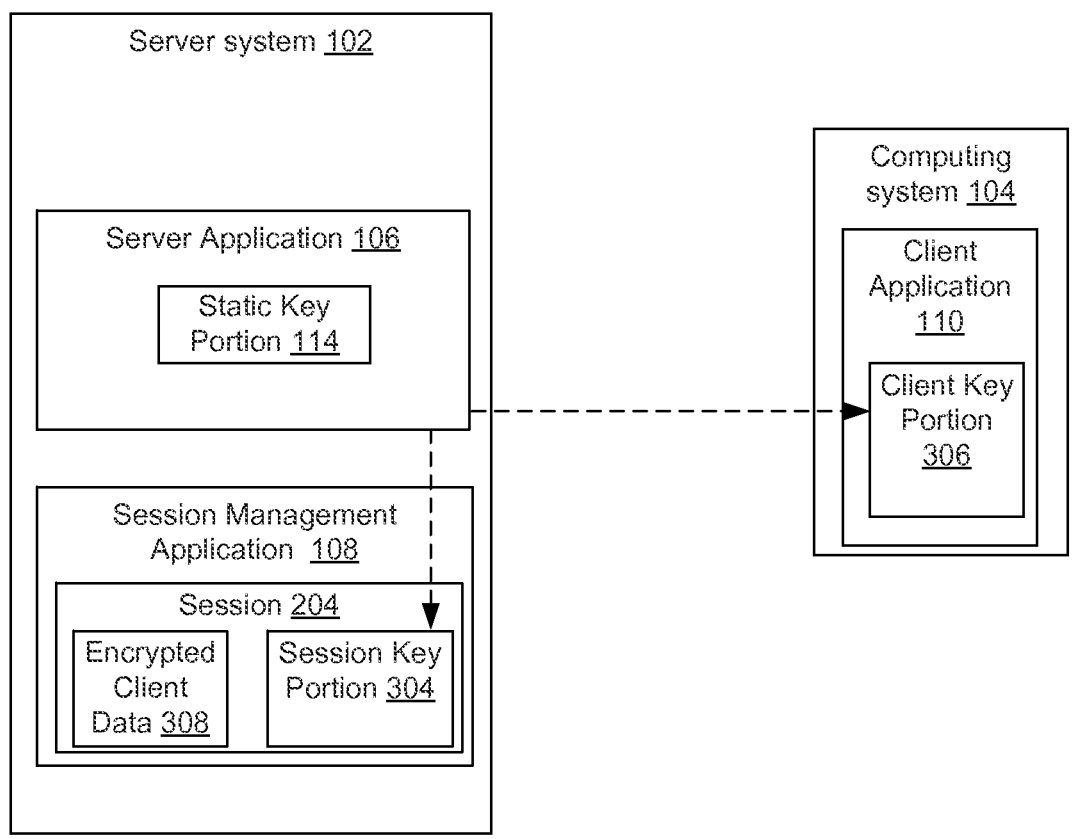
FIG. 4 is a modeling diagram depicting the server application providing the client key portion of the combined encryption key to the client application.

The server application 106 can distribute the temporary key portions among the server system 102 and the computing system 104. For example, FIG. 4 is a modeling diagram depicting the server application 106 providing the client key portion 306 of the combined encryption key 302 to the client application 110. In some embodiments, the server application 106 can also provide the session key portion 304 of the combined encryption key 302 to the session management application 108.

In embodiment aspects, the server application 106 can delete the client key portion 306 from the server system 102 after providing the client key portion 306 to the client application 110. Deleting the client key portion 306 from the server system 102 can increase the security of the encrypted client data 308. For example, in the event that the server system 102 is compromised, the encrypted client data 308 cannot be decrypted without the client key portion 306 used to generate the combined encryption key 302. An unauthorized party would be unable to decrypt the encrypted client data 308 without obtaining access to both the server system 102 and the computing system 104.

Figure 5:
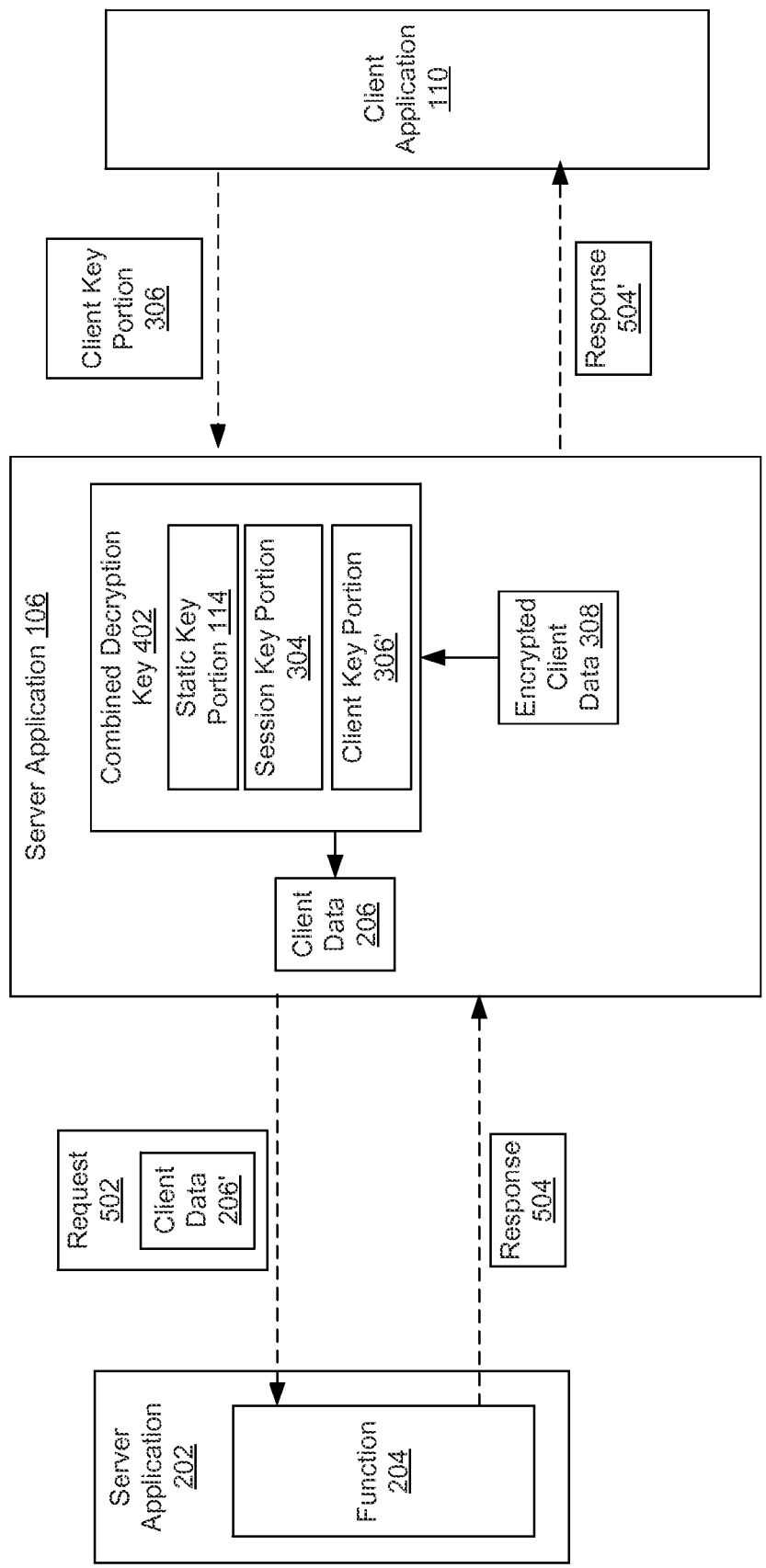
FIG. 5 is a modeling diagram depicting the server application obtaining the client key portion from the client application to obtain decrypted client data for an additional transaction involving the additional server application.

In subsequent transactions that involve client data 206 during the session 220, the server application 106 can obtain the client key portion 306 from the client application 110. For example, FIG. 5 is a modeling diagram depicting the server application 106 obtaining the client key portion 306 from the client application 110 to obtain decrypted client data 206 for an additional transaction involving the additional server application 202.

The server application 106 can obtain the client key portion 306 from the client application 110 in response to determining that a transaction during the session 120 involves the function 204 provided by the additional server application 202. The server application 106 can also access the session key portion 304 from the session management application 108. The server application 106 can generate a combined decryption key 402 by combining the static key portion 114, the session key portion 304, and the client key portion 306.

The server application 106 can use the combined decryption key 402 to decrypt the encrypted client data 308 and obtain the decrypted client data 206. The server application 106 can transmit a request 502 for the function 204 to the server application 202. The request 502 can include copied client data 206. The server application 202 can execute the function 204 using the client data 206' and provide a response 504. The server application 106 can forward the response 504' to the client application 110.

Figure 6:
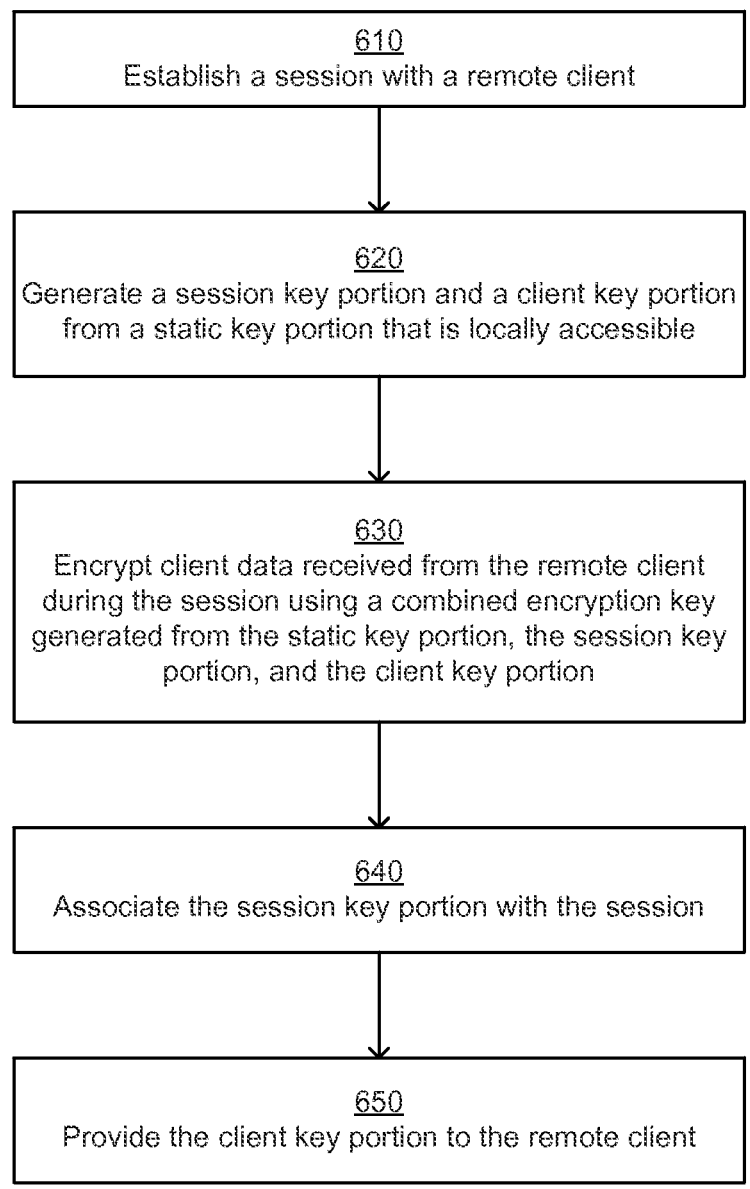
FIG. 6 is a flow chart illustrating an example method for distributing a key for decrypting client data.

Any suitable process can be used for generating and providing a client portion of a key to a remote client. For example, FIG. 6 is a flow chart illustrating an example method 600 for distributing a key for decrypting client data. For illustrative purposes, the method 600 is described with reference to the systems and processes depicted in FIGS. 1-5. Other implementations, however, are possible.

The method 600 involves establishing a session with a remote client, as depicted in block 610. For example, a session management application 108 that is executed at a server system 102 can establish a session 120 with a client application 110 that is executed at a computing system 104, as described above with respect to FIG. 1. The client application 110 can access the server application 106 via a data network.

For example, a client application 110 such as a web browser application can access the server application 106 via the website. The server application 106 can prompt or otherwise request one or more credentials 116 (e.g., a user name and password) from the client application 110. The client application 110 can provide the credential(s) 110 to the server application 106. The server application 106 can provide the credentials to the session management application 108 via a session command 118. The session management application 108 can authenticate the client application 110 by comparing the credential(s) 110 to stored authentication information for the client account 112. The session management application 108 can establish the session 120 based on the credential(s) 110 matching the stored authentication information for the client account 112.

The method 600 further involves generating a session key portion and a client key portion from a static key portion, as depicted in block 620. For example, the server application 106 can generate the session key portion 304 and the client key portion 306 as described above with respect to FIG. 3.

The method 600 further involves encrypting client data received from the remote client during the session using a combined encryption key generated from the static key portion, the session key portion, and the client key portion, as depicted in block 630. For example, the server application 106 can encrypt the client data 206 received from the client application 110 with a combined encryption key 302, as described above with respect to FIGS. 2-3. The encrypted client data 308 can be stored by the session management application 108 in a database or other suitable data structure for retrieval by the server application 106.

The server application 106 can use any suitable process to generate the combined encryption key 302 from the static key portion 114, the session key portion 304, and the client key portion 306. In a non-limiting example, the server application 106 can generate the combined encryption key 302 by concatenating the static key portion 114, the session key portion 304, and the client key portion 306. For example, the static key portion 114 may include the characters "abc," the client portion 306 may include the characters "xyz," and the session key portion 304 may include the characters "123." A combined encryption key 302 may be a concatenation of the characters (e.g. "abc123xyz") or a concatenation of the characters and a separator (e.g. "abc:123:xyz"). In another non-limiting example, the static key portion 114, the session key portion 304, and the session key portion 306 can be provided as inputs to a mathematical or cryptographic function that outputs the combined encryption key 302. For example, the static key portion 114, the session key portion 304, and the session key portion 306 can be provided as inputs to an MD5 message-digest algorithm or other cryptographic hash function. The combined encryption key 302 can be a hash value outputted by the MD5 message-digest algorithm or other cryptographic hash function.

The method 600 further involves associating the session key portion with the authenticated session, as depicted in block 640. For example, the server application 106 can provide the session key portion 304 to the session management application 108, as described above with respect to FIGS. 2-3. The session key portion 304 can be used during the session 120 to generate a combined decryption key 402. Expiration or termination of the session 120 can cause the session key portion 304 to be invalidated. Invalidating the session key portion 304 can prevent the session key portion 304 from being used to generate a combined decryption key 402.

The method 600 further involves providing the client key portion to the remote client, as depicted in block 650. For example, the server application 106 can provide the client key portion 306 to the client application 110 via a data network, as described above with respect to FIGS. 2-3. In some embodiments, the server application 106 can delete the client key portion 306 from the server system 102 or otherwise make the client key portion 306 inaccessible to the server system 102 after the client key portion is provided to the client application 110.

Figure 7:
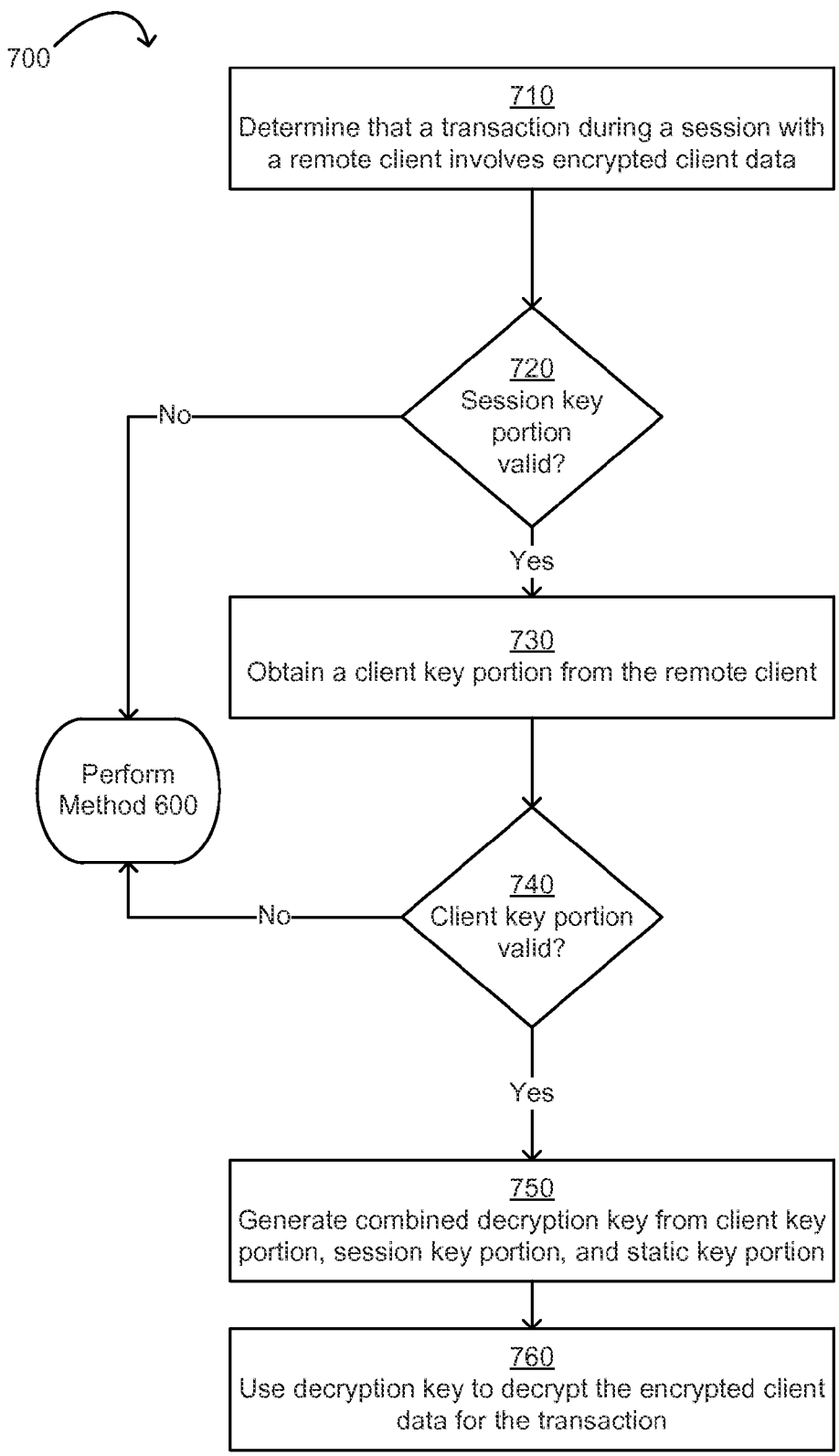
FIG. 7 is a flow chart illustrating an example method for decrypting client data that is encrypted using a distributed encryption key.

During the session 120, the server application 106 can generate a combined decryption key 402 to access the encrypted client data 308. For example, FIG. 7 is a flow chart illustrating an example method 700 for decrypting client data that is encrypted using a distributed encryption key. For illustrative purposes, the method 700 is described with reference to the systems and processes depicted in FIGS. 1-5. Other implementations, however, are possible.

The method 700 involves determining that a transaction during a session with a remote client involves encrypted data, as depicted in block 710. For example, during a session 120, a server application 106 may request a function 204 provided by an additional server application 202, as depicted in FIG. 5. Performing the function 204 may involve using client data 206. For example, the server application 202 may require that an entity requesting the function 204 be authenticated with one or more credentials that are different from the credential 116 used to establish the session 120. The client data 206 can include the credentials used for authentication by the server application 202.

The client data 206 may be stored as encrypted client data 308 at the server system 102. Decrypting the client data 206 can involve generating a combined decryption key 402 from the static key portion 114, the session key portion 304, and the client key portion 306.

The method 700 further involves determining whether the session key portion 304 is valid, as depicted in block 720. The session management application 108 can determine whether the session key portion 304 is valid. For example, the session key portion 304 may be invalid if the session 120 has expired or is otherwise terminated by the server application 106. If the session key portion 304 is invalid, the method 700 terminates and method 600 is performed.

If the session key portion 304 is valid, the method 700 further involves obtaining the client key portion 306, as depicted in block 730. For example, the client application 110 can provide the client key portion to the server application 106 via a data network during a session 120.

The method 700 further involves determining whether the client key portion 306 is valid, as depicted in block 730. One or more of the server application 106 and the session management application 108 can determine whether the client key portion 306 is valid. In one non-limiting example, the client key portion 306 may be invalid if the session 120 has expired or is otherwise terminated. In another non-limiting example, the client key portion 306 may be invalid if received from a computing system having a different network identifier (e.g., an internet protocol address) than the computing system 104 that established the session 120. If the client key portion 306 is invalid, the method 700 terminates and method 600 is performed.

If the client key portion 306 is valid, the method 700 further involves generating the combined decryption key 402, as depicted in block 750. The server application 106 can use any suitable process to generate the combined decryption key 402 from the static key portion 114, the session key portion 304, and the client key portion 306. In a non-limiting example, the server application 106 can generate the combined decryption key 402 by concatenating the static key portion 114, the session key portion 304, and the client key portion 306.

The method 700 further involves using the combined decryption key 402 to decrypt the encrypted client data 308 for the transaction, as depicted in block 760. For example, the server application 106 can decrypt a credential for the additional server application 202 or other encrypted client data 308. The server application 106 can use the decrypted client data 206 for the transaction. In some embodiments, the server application 106 can generate a decrypted copy of the encrypted client data 308 for the transaction and delete the decrypted copy after use of the decrypted client data 206. In other embodiments, the server application 106 can decrypt the encrypted client data 308 stored at the server system 102 and re-encrypt the client data 206 using the combined encryption key 302 after use of the decrypted client data 206.

In additional or alternative embodiments, the server application 106 can invalidate the combined decryption key 408 and the copy of the client key portion 306 stored at the server after use of the decrypted client data 206. In one non-limiting example, the server application 106 may delete the combined decryption key 408 and the copy of the client key portion 306 after using the combined decryption key 408 to decrypt the encrypted client data 308. In another non-limiting example, the combined decryption key 408 may be associated with an expiration time. The combined decryption key 408 may be valid before the expiration time and invalid after the expiration time.

Figure 8:
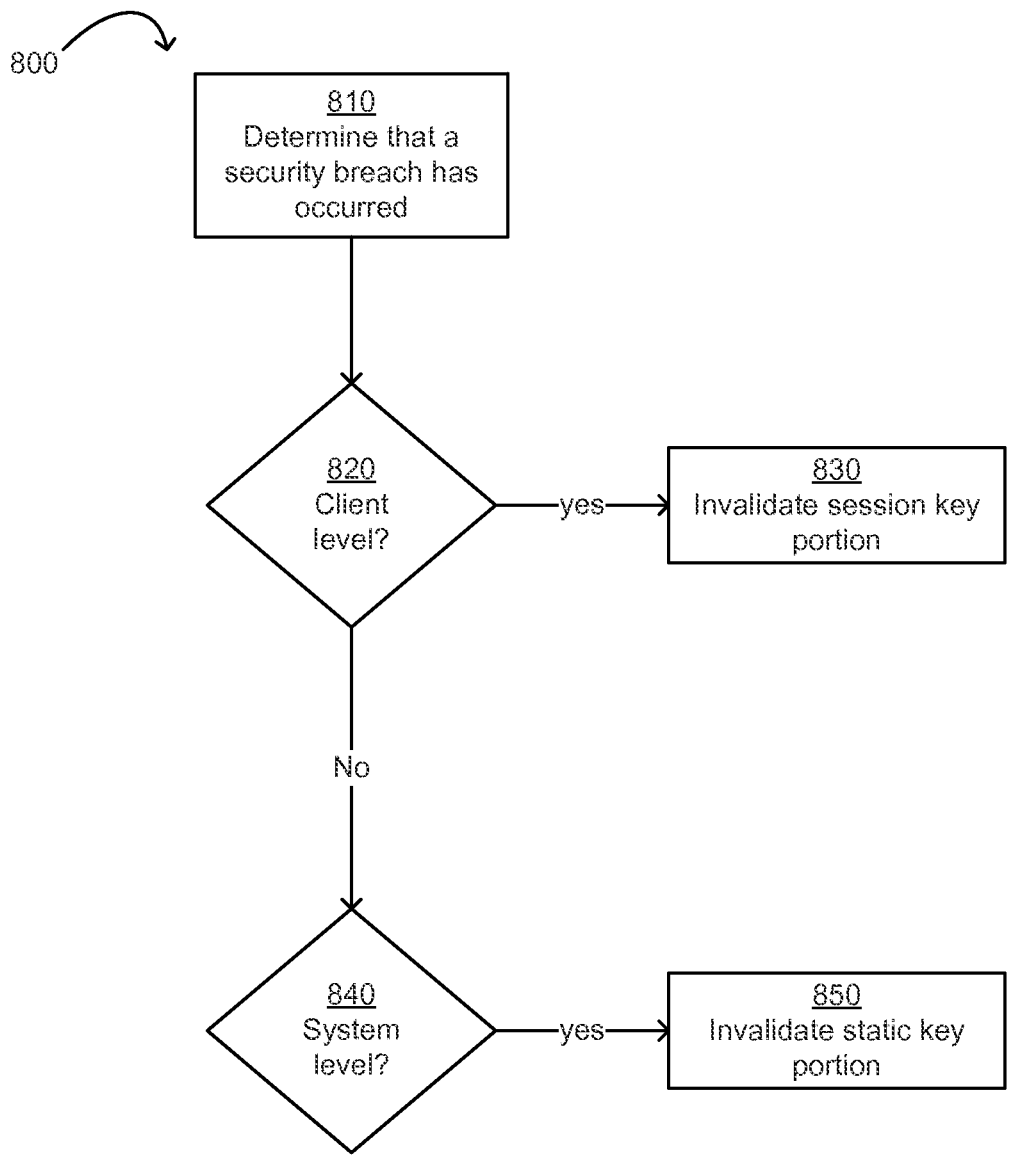
FIG. 8 is a flow chart illustrating an example method for responding to a security breach of one or more systems using distributed encryption.

FIG. 8 is a flow chart illustrating an example method 800 for responding to a security breach of one or more systems using distributed encryption. For illustrative purposes, the method 800 is described with reference to the systems and processes depicted in FIGS. 1-5. Other implementations, however, are possible.

The method 800 involves determining that a security breach has occurred, as depicted in block 810. A security breach can include any unauthorized access of a system involved in processing, storing, communicating, or otherwise using the client data 206.

The method 800 further involves determining whether the security breach is a client-level breach, as depicted in block 820. In one non-limiting example, a client-level breach may involve the server application 106 being notified or otherwise determining that an unauthorized entity has obtained access to the computing system 104. In another non-limiting example, a client-level breach may involve the server application 106 being notified or otherwise determining that an unauthorized entity has obtained access to information between the server system 102 and the computing system 104 during the session.

If the security breach is a client-level breach, the method further involves invalidating the session key portion 304, as depicted in block 830. Invalidating the session key portion 304 can involve deleting the session key portion 304 or otherwise causing the session key portion 304 to be inaccessible by the server application 106 or the session management application 108. Invalidating the session key portion 304 can prevent generation of the combined decryption key 402. Preventing generation of the combined decryption key 402 can prevent decryption of the stored encrypted client data 308, thereby maintaining security of the client data.

If the security breach is not a client-level breach, the method 800 further involves determining whether the security breach is a system-level breach, as depicted in block 840. A system-level breach can involve determining that an unauthorized entity has obtained access to the server system 102. If the security breach is a system-level breach, the method further involves invalidating the static key portion 114, as depicted in block 870. Invalidating the static key portion 114 can include deleting the static key portion 114 or otherwise making the static key portion 114 unusable for generating a combined encryption or decryption key. In a non-limiting example, the same static key portion 114 may be used to generate combined encryption and decryption key for different client accounts 112. Invalidating the static key portion 114 can prevent decryption of encrypted client data associated with each client account, thereby maintaining the security of the stored data in the event that the server system 102 is compromised.

Figure 9:
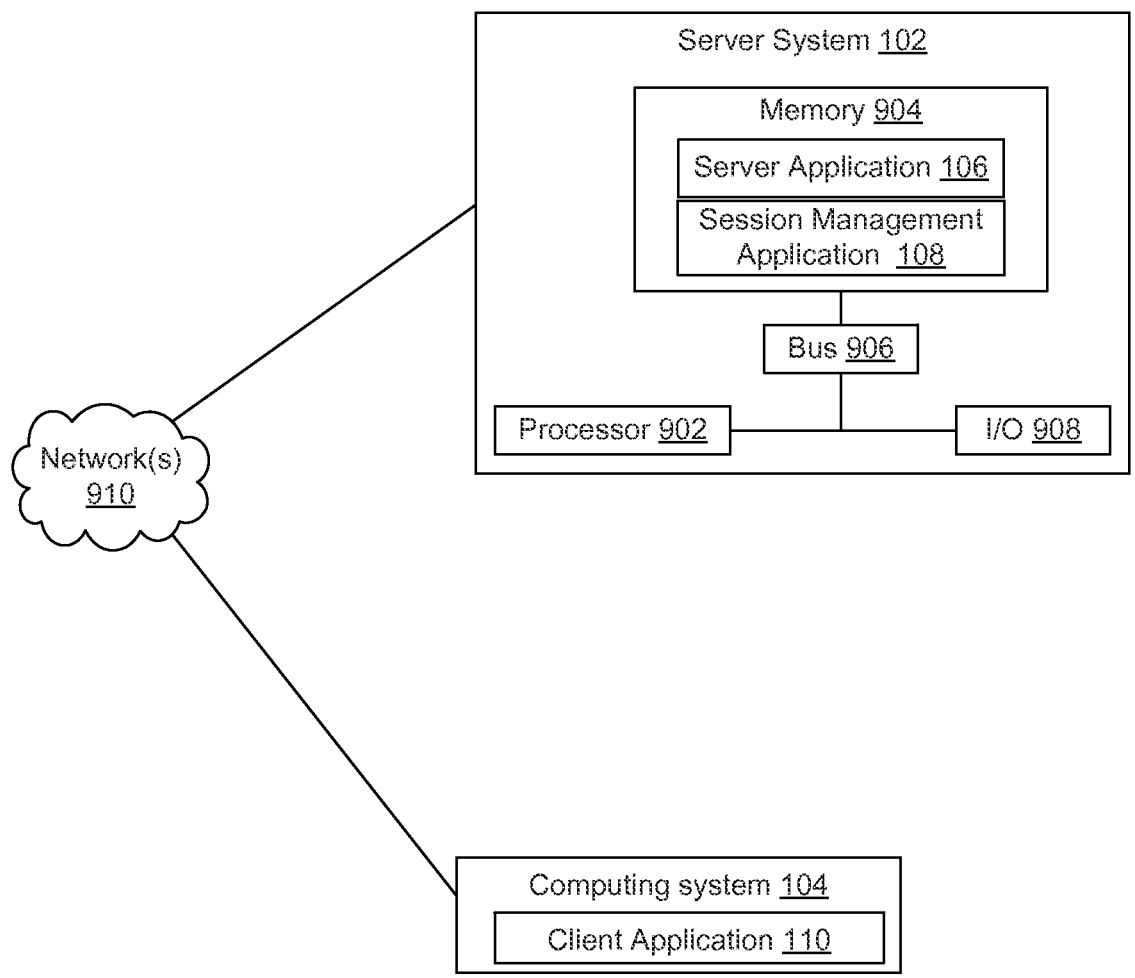
FIG. 9 is a block diagram depicting example computing systems for implementing certain embodiments.

Any suitable computing system or architecture can be used to implement the server system 102. FIG. 9 is a block diagram depicting example computing systems for implementing certain embodiments. The example computing systems include a server system 102 and a computing system 104 in communication via a data network 910.

The server system 102 includes a processor 902. The processor 902 may include a microprocessor, an application-specific integrated circuit ("ASIC"), a state machine, or other suitable processing device. The processor 902 can include any number of computer processing devices, including one. The processor 902 can be communicatively coupled to a computer-readable medium, such as a memory 904. The processor 902 can execute computer-executable program instructions and/or accesses information stored in the memory 904. The memory 904 can store instructions that, when executed by the processor 902, cause the processor to perform operations described herein. Examples of such instructions include the server application 106 and the session management application 108.

A computer-readable medium may include (but is not limited to) an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The server system 102 can also include a bus 906 and an input/output ("I/O") interface 908. The bus 906 can communicatively couple one or more components of the server system 102. The I/O interface 908 can receive input from input devices (e.g., a keyboard, a mouse, a touch screen, etc.) and provide output to output devices.

The server system 102 can include any suitable computing system or group of computing systems for hosting or accessing server application 106 and the session management application 108. In some embodiments, the server system 102 may be a single computing system. In other embodiments, the server system 102 may be a virtual server implemented using a number of computing systems connected in a grid or cloud computing topology.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
    establishing a session between a server and a remote client;
    generating a session key portion for the session and a client key portion for the remote client;
    encrypting client data received from the remote client during the session using a combined encryption key generated from a static key portion accessible by the server, the session key portion, and the client key portion;
    associating the session key portion with the session;
    storing the session key portion and the encrypted client data in a location inaccessible to the remote client, wherein the session key portion and the encrypted client data are accessible to the server and used for subsequent transactions between the server and an additional server during the session;
    providing the client key portion to the remote client;
    deleting the client key portion from the server;
    determining, subsequent to deleting the client key portion from the server, that a subsequent transaction between the server and the additional server involves providing decrypted client data from the server to the additional server; and
    responsive to determining that the subsequent transaction involves providing the decrypted client data from the server to the additional server:
        obtaining the client key portion from the remote client,
        decrypting the client data with a combined decryption key that is generated by the server from the session key portion, the static key portion, the obtained client key portion, and
        providing the decrypted client data from the server to the additional server.

2. The method of claim 1, wherein the session comprises a period of time during which the remote client is authorized to access at least one application hosted by the server system.

3. The method of claim 1, wherein the subsequent transaction comprises executing a function provided by the additional server, wherein the client data comprises authentication information for the additional server that is different from authentication information used to establish the session between the server and the remote client.

4. The method of claim 1, wherein the session key portion and the client key portion are generated from a random number generator.

5. The method of claim 1, further comprising:
    determining that the session is expired; and
    invalidating the session key portion.

6. The method of claim 1, further comprising:
    determining that an additional transaction involves the client data encrypted with the combined encryption key;
    determining that the session key portion is expired; and
    requesting the client data from the remote client responsive to determining that the session key portion is expired.

7. The method of claim 1, further comprising:
    determining that an additional transaction involves the client data encrypted with the combined encryption key;
    obtaining the client key portion;
    determining that the client key portion is expired; and
    requesting the client data from the remote client responsive to determining that the client key portion is expired.

8. The method of claim 1, further comprising:
    determining that a security breach has occurred with respect to the remote client; and
    invalidating the session key portion in response to determining that the security breach has occurred.

9. The method of claim 1, further comprising:
    determining that a security breach has occurred with respect to the server; and
    invalidating the static key portion in response to determining that the security breach has occurred.

10. A server system comprising:
    a processor; and
    a non-transitory computer-readable medium communicatively coupled to the processor,
    wherein the processor is configured to execute program code stored to the non-transitory computer-readable medium for performing operations comprising:
        establishing a session between the server system and a remote client;

generating a session key portion for the session and a client key portion for the remote client, encrypting client data received from the remote client during the session using a combined encryption key generated from a static key portion accessible by the server system, the session key portion, and the client key portion, associating the session key portion with the session, storing the session key portion and the encrypted client data in a location inaccessible to the remote client, wherein the session key portion and the encrypted client data are accessible to the server and used for subsequent transactions between the server system and an additional server system during the session, providing the client key portion to the remote client, deleting the client key portion from the server system;

determining, subsequent to deleting the client key portion from the server system, that a subsequent transaction between the server system and the additional server system involves providing the decrypted client data from the server system to the additional server system, and responsive to determining that the subsequent transaction involves providing the decrypted client data from the server system to the additional server system:

obtaining the client key portion from the remote client, decrypting the client data with a combined decryption key that is generated by the server system from the session key portion, the static key portion, the obtained client key portion, and providing the decrypted client data from the server system to the additional server system.

11. The server system of claim 10, wherein the subsequent transaction comprises executing a function provided by the additional server system, wherein the client data comprises authentication information for the additional server system different from authentication information used to establish the session between the server system and the remote client.

12. The server system of claim 10, wherein the operations further comprise:

determining that a security breach has occurred with respect to the remote client; and invalidating the session key portion in response to determining that the security breach has occurred.

13. The server system of claim 10, wherein the operations further comprise:

determining that a security breach has occurred with respect to the server system; and invalidating the static key portion in response to determining that the security breach has occurred.

14. A non-transitory computer-readable medium embodying program code executable by a processing device, the non-transitory computer-readable medium comprising:

program code for establishing a session between a server and a remote client;

program code for generating a session key portion for the session and a client key portion for the remote client;

program code for encrypting client data received from the remote client during the session using a combined encryption key generated from a static key portion accessible by the server, the session key portion, and the client key portion;

program code for associating the session key portion with the session;

program code for storing the session key portion and the encrypted client data in a location inaccessible to the remote client, wherein the session key portion and the encrypted client data are accessible to the server and used for subsequent transactions between the server and an additional server during the session;

program code for providing the client key portion to the remote client;

program code for deleting the client key portion from the server;

program code for determining, subsequent to deleting the client key portion from the server, that a subsequent transaction between the server and the additional server involves providing decrypted client data from the server to the additional server; and program code for, responsive to determining that the subsequent transaction involves providing the decrypted client data from the server to the additional server, performing operations comprising:

obtaining the client key portion from the remote client, decrypting the client data with a combined decryption key that is generated by the server from the session key portion, the static key portion, the obtained client key portion, and providing the decrypted client data from the server to the additional server.

15. The non-transitory computer-readable medium of claim 14, further comprising:

program code for determining that an additional transaction involves the client data encrypted with the combined encryption key;

program code for determining that the session key portion is expired; and program code for requesting the client data from the remote client responsive to determining that the session key portion is expired.

16. The non-transitory computer-readable medium of claim 14, further comprising:

program code for determining that an additional transaction involves the client data encrypted with the combined encryption key;

program code for obtaining the client key portion;

program code for determining that the client key portion is expired; and program code for requesting the client data from the remote client responsive to determining that the client key portion is expired.

17. The server system of claim 10, wherein the processor is further configured to perform additional operations comprising:

determining that the session is expired; and invalidating the session key portion.

18. The non-transitory computer-readable medium of claim 14, further comprising:

program code for determining that the session is expired; and program code for invalidating the session key portion.

19. The server system of claim 10, wherein the processor is further configured to perform additional operations comprising:

determining that an additional transaction involves the client data encrypted with the combined encryption key;

determining that the session key portion is expired; and requesting the client data from the remote client responsive to determining that the session key portion is expired.

* * * * *